United States Patent [19]

Salminen

[11] 4,428,324

[45] Jan. 31, 1984

[54] METHOD AND APPARATUS FOR PREVENTING PIGLETS FROM SUFFOCATING UNDER THE DAM IN A BROODING PEN

[76] Inventor: Ensio Salminen, 21890 Haveri, Finland

[21] Appl. No.: 385,657

[22] PCT Filed: Oct. 9, 1981

[86] PCT No.: PCT/FI81/00075
§ 371 Date: May 25, 1982
§ 102(e) Date: May 25, 1982

[87] PCT Pub. No.: WO82/01300
PCT Pub. Date: Apr. 29, 1982

[30] Foreign Application Priority Data

Oct. 10, 1980 [FI] Finland ................................ 803228

[51] Int. Cl.³ ............................................. A01K 1/02
[52] U.S. Cl. ..................................................... 119/20
[58] Field of Search ....................................... 119/16, 20

[56] References Cited

U.S. PATENT DOCUMENTS

| 436,902 | 9/1890 | Osborn | 119/16 |
| 3,042,000 | 7/1962 | McMurray et al. | 119/20 |
| 3,181,503 | 5/1965 | Tripp | 119/20 |
| 4,145,993 | 3/1979 | Notarianni et al. | 119/20 |

FOREIGN PATENT DOCUMENTS 932189 7/1963 United Kingdom ................. 119/20

Primary Examiner—Hugh R. Chamblee
Attorney, Agent, or Firm—McGlew and Tuttle

[57] ABSTRACT

A method and apparatus prevents piglets from being suffocated under a sow by detecting when the sow stands up and establishing an unpleasant condition, specifically blowing air under the sow to discourage the piglets from moving under the sow. A pleasant condition can simultaneously be established at a location spaced from a pen confining the sow to further encourage the piglets to stay away from the underside of the standing sow.

12 Claims, 2 Drawing Figures

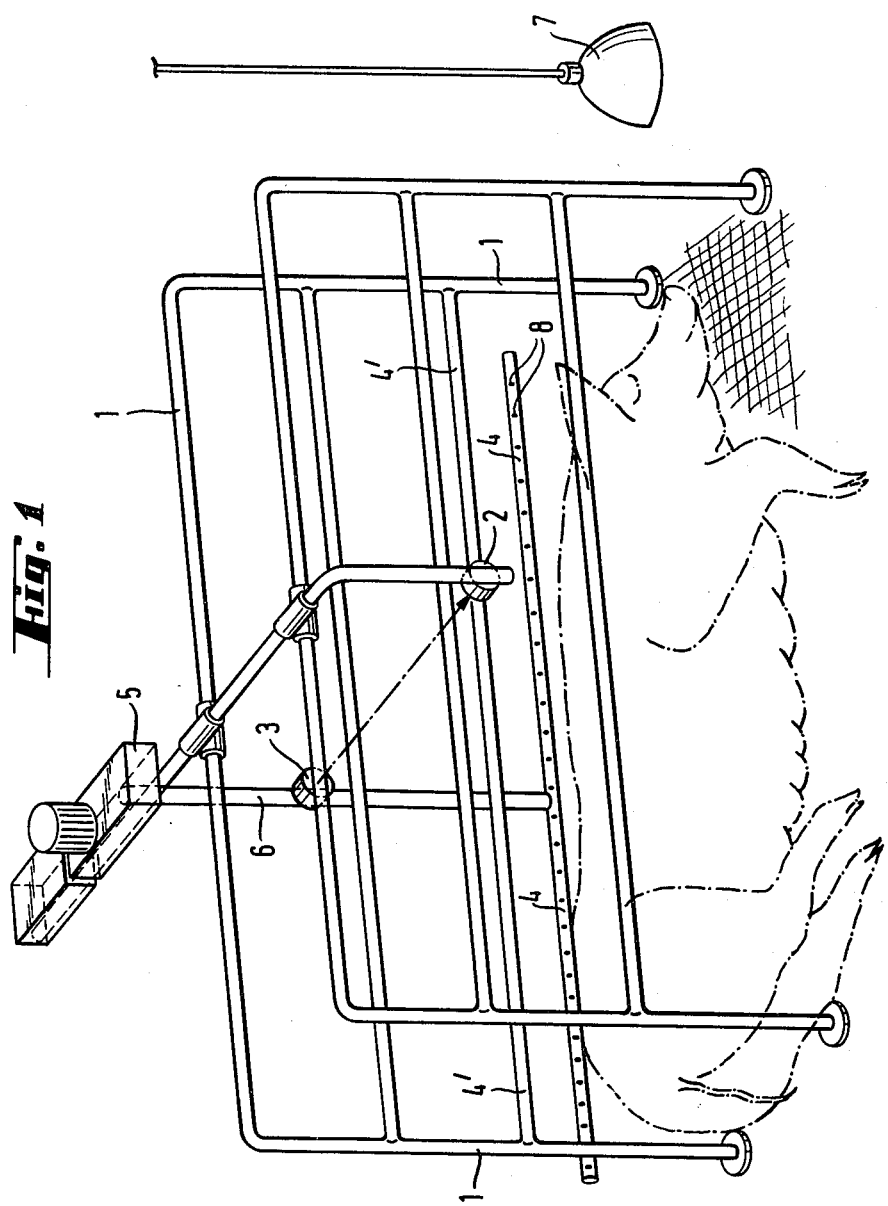

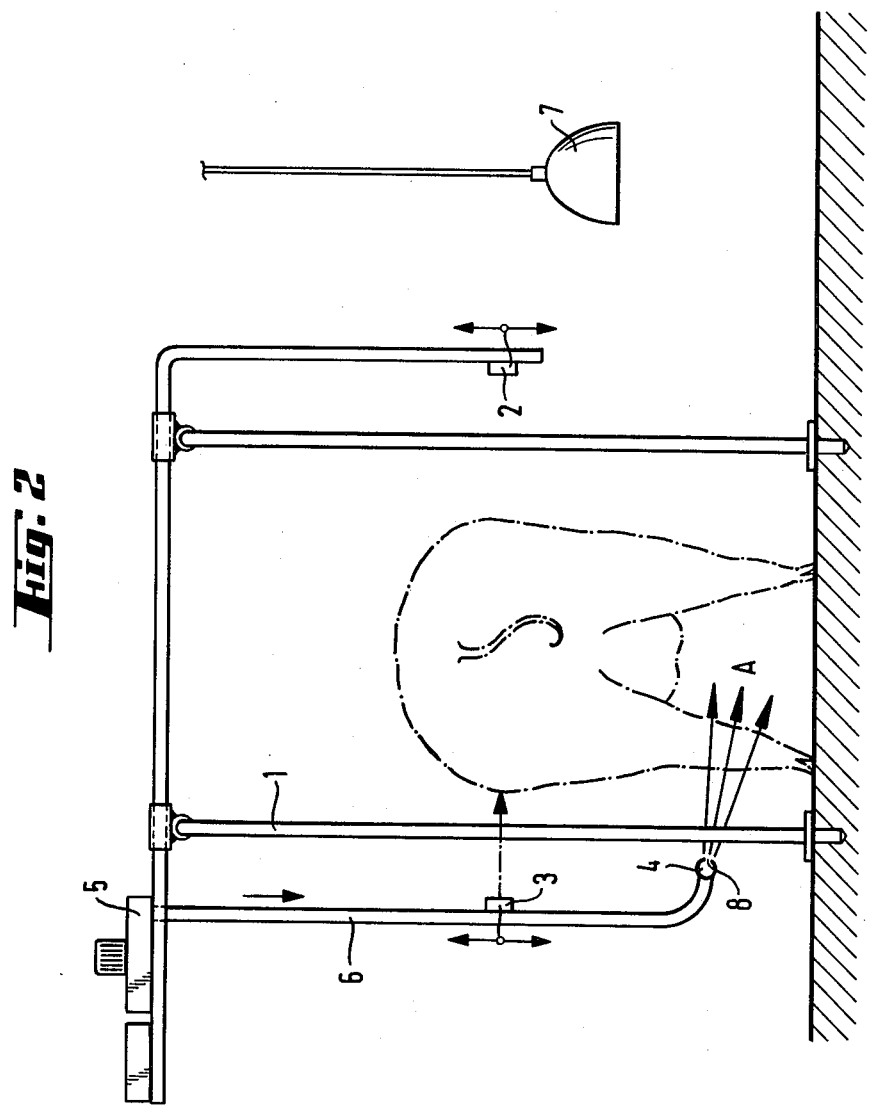

METHOD AND APPARATUS FOR PREVENTING PIGLETS FROM SUFFOCATING UNDER THE DAM IN A BROODING PEN

FIELD AND BACKGROUND OF THE INVENTION

The present invention relates to a method for preventing piglets from suffocating under the dam in a brooding pen provided with a particular bay or equivalent space reserved for the dam, the method using a suitable sensor, for example a photocell, for detecting when the dam stands up and lies down. The invention also relates to an apparatus for the application of the aforementioned method.

It is generally known that when the dam stands up to eat or drink either during or after farrowing, the piglets tend to creep under the dam. This is evidently due to the fact that the place where the dam has lain is warm, as well as to the piglets' natural instinct to be in immediate contact with the dam. When the dam lies down again, there is great danger that all piglets do not move away from under the dam quickly enough. Piglets are often killed, particularly under old and fat brooding sows.

In prior practice it has been tried to eliminate this drawback for instance by constructing various bay structures for brooding pens. The purpose of such bays is to limit the movements of the dam, whereas the piglets can move freely in the pen irrespective of the bay. In the prior art it is also known to employ heat lamps or heat planes in the brooding pen. The use thereof is based on the fact that piglets like warm and light conditions and consequently tend to draw close to the lamp or equivalent.

British Patent No. 932 189 discloses a bay construction for a brooding sow, the bay comprising separate side partitions with respect to the piglets, which partitions can be lifted and lowered. While the dam is lying down, the partitions at the sides of the bay are lifted, so that the piglets can suck the dam in a normal way. When the dam stands up, the photocell detects the action and immediately lowers the partitions. Now the piglets cannot enter the dangerous area. Similarly, after the dam has lain down, the photocell causes the partitions to be raised. The drawback of the described arrangement is its complex structure. This naturally leads to a high price.

SUMMARY OF THE INVENTION

The purpose of the present invention is, among other things, to avoid the above drawbacks. The invention is based on the idea that in the brooding pen a situation exists with strongly opposed conditions with respect to the piglets. It is generally known that piglets do not like drafts or the cold, whereas they are drawn to warm, light and draftless places. Accordingly an object of the present invention is to provide a method of preventing piglets from suffocating under a dam in a brooding pen comprising detecting when the dam stands up and blowing air under the dam to discourage piglets from moving under the dam.

A further object of the invention is to provide an apparatus for effecting such a method comprising a detector positioned to sense when a dam stands up, a blower connected to the detector to be activated by activation of the detector and conduit means connected to the blower for directing air blown by the blower under the dam when the detector is activated.

The most remarkable advantages of a method and apparatus according to the invention is its "naturality". Experience has shown that already after one day the piglets learn to behave safely, so that they no longer try to creep under the dam. Another advantage of the apparatus is its simple construction and low price. It can for example be a part of the brooding pen. Moreover, it is sufficient that the apparatus is employed for instance 24 hours after the farrowing, after which it can be switched off. A separate, independent apparatus can be shifted to another brooding pen when necessary.

BRIEF DESCRIPTION OF THE DRAWINGS

In the following the invention is explained in detail with reference to the appended drawings wherein:

FIG. 1 is an illustration of one preferred embodiment of the invention in perspective view, and FIG. 2 is an illustration of the apparatus of FIG. 1 seen from behind.

DESCRIPTION OF THE PREFERRED EMBODIMENT

The arrangement according to the invention comprises a narrow bay 1 or similar space reserved for the dam, which space forms part of the brooding pen. The bay 1 can be of any of conventional types. At the sides of the bay 1, preferably at its center, is mounted a photocell arrangement, which consists of a suitable receiver 2 and of a transmitter 3. These are placed at such a height from the ground that while the dam is lying down, a ray of light or equivalent can unobstructedly enter through the bay 1. When the dam stands up, its back obstructs the passage of the ray of light.

At the other end of the bay 1, comparatively near to the ground, is placed a horizontal pipe 4. The pipe 4 is provided with several small perforations 8, through which air can be blown evenly in narrow jets to the space under a dam when it is standing up. The air is blowed with a blower 5 or with a similar device through the vertical pipe 6, to the horizontal pipe 4. On the opposite side of the bay, with respect to the horizontal pipe 4, is placed in a conventional fashion a heat lamp 7 or other similar illumination and/or radiation device.

The apparatus according to the invention functions in the following manner. While the dam is lying down in the bay 1, the piglets can suck it in a natural way. When the dam stands up for example to drink or eat, its back obstructs the ray of light coming from the photocell arrangement 2, 3. As a consequence the blower 5 is switched on and starts blowing air under the dam through the perforations 8 of the horizontal pipe 4, in this case only from one direction A. Thus under the dam is formed a condition which is unpleasant for the piglets, and they turn to the direction of the air flow. On the opposite side of the brooding pen, outside the bay 1, in the direction of the air flow, is located a heat lamp 7, which further emphasizes the contradictory circumstances. When the dam lies down again, the receiver 2 of the photocell detects the ray of light coming from the transmitter 3, the blower 5 stops operation and the piglets return to suck the dugs of the dam.

Experience has shown that new-born piglets generally learn during the first 24 hours to retreat from under the dam and to move towards the heat lamp 7 immediately when the dam stands up. Thus the method according to the invention remarkably decreases the death-rate of piglets during the first days of their lives.

The apparatus 4, 5, 6 of the invention and the dectector 2, 3 attached to it can form a stationary part of the bay 1. In this case for example the horizontal pipe 4 can be replaced by the pipe 4' belonging to the structure of the bay 1, which pipe 4' can be perforated like the horizontal pipe 4. On the other hand, the apparatus with the detector can form a separate device to be attached to the bay, as presented in FIGS. 1 and 2.

In the above embodiment of the invention the blower 5 is arranged in connection with each apparatus. It is also possible that several separate apparatuses have the same blower in common. In these cases, a compressor or other generally known device which produces pressure air, can also be used instead of the blower.

The blowing of the air under the standing dam can be carried out, except for blowing it through the horizontal pipe 4, 4' provided with perforations 8, also through one or several suitable nozzles which efficiently spread the air flow in a fanlike fashion.

It is pointed out that the blowing of the air in the brooding pen can, if desired, also be arranged to take place from a direction other than that of the above embodiment, or from several directions. The essential feature of the invention is that the air flows away from under the dam standing in the bay or equivalent space.

In the above the invention has been described mainly with reference to one preferred embodiment only. It is, however, clear that the invention is by no means limited exclusively to the described application, but the apparatuses according to the invention can vary even to a great extent without deviating from the scope of the invention as defined in the following patent claims.

I claim:

1. A method for preventing piglets from suffocating under a dam in a brooding pen provided with a bay (1) space reserved for the dam, in which method the standing up and lying down of the dam are detected by a sensor, for characterized in that after the dam has stood up, under it are arranged unpleasant conditions for the piglets by blowing air under the dam according to an indication of the sensor.

2. The method of claim 1, characterized in that the air is blown mainly from one side of the dam towards a heat lamp (7), which is placed outside the bay (1) in the direction of the air flow.

3. A method of preventing the young of a parent animal from being harmed under the parent animal comprising:
   detecting when the parent animal rises; and
   establishing a flow of air in a flow direction under the parent animal when it has risen.

4. A method according to claim 3, including confining the parent animal to a pen.

5. A method according to claim 4, including establishing a warmth condition which is pleasant to the young at a location spaced from the pen.

6. An apparatus for preventing piglets from being suffocated by a dam in a brooding pen comprising:
   a detector positioned to detect the presence of a dam at a selected vertical location in the pen, which location is occupied by the dam when the dam in standing; and
   a blower operable to direct an air current under the dam when the dam is standing in the pen, said blower connected to said detector and activated by said detector when said detector detects the presence of the dam at said selected vertical location.

7. An apparatus according to claim 6 wherein said detector comprises a photo cell arrangement.

8. An apparatus according to claim 6, including a heat lamp mounted at a location spaced from said pen for establishing a condition which is pleasant to the piglets to attract the piglets away from an area below the dam when the dam is standing in said pen.

9. An apparatus according to claim 8, wherein said heat lamp is positioned with respect to said pen in a direction of flow of the air blown by said blower.

10. An apparatus according to claim 6, including a vertical pipe connected to said blower and a horizontal pipe connected to said vertical pipe at a location remote from said blower, said horizontal pipe extending in a lengthwise direction of said pen and positioned at a vertical location corresponding to an underside of a dam when a dam is standing in said pen so that air blown by said blower is directed under a standing dam in said pen.

11. An apparatus according to claim 10, wherein said pen includes means defining a bay for confining either side of a dam, said means including said horizontal pipe as a constructional part thereof.

12. An apparatus according to claim 10, wherein said pen includes means defining a bay for confining a dam, said blower and said vertical and horizontal pipes with said detector forming a separate unit from said means defining said bay.

* * * * *